Dec. 1, 1964
E. I. KAZAN
3,159,750
PHOTOELECTRIC PRESSURE TRANSDUCER
Filed Oct. 1, 1962
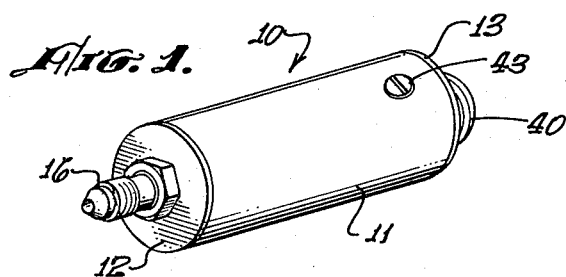
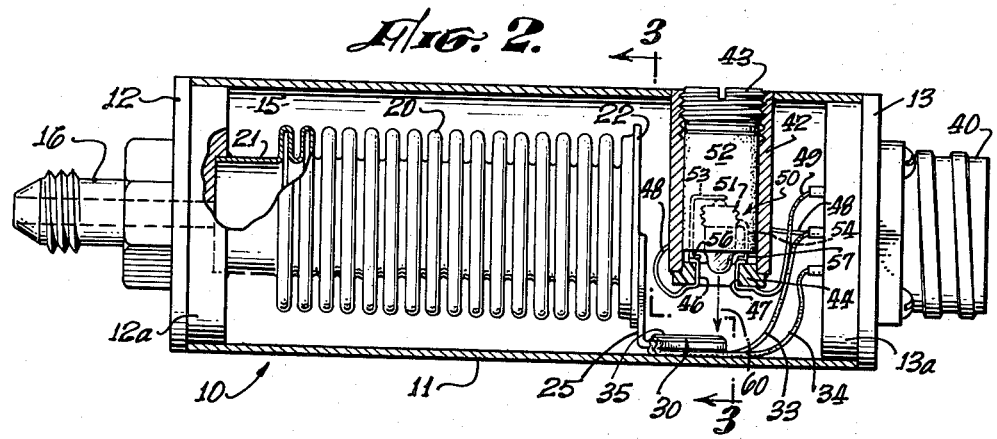
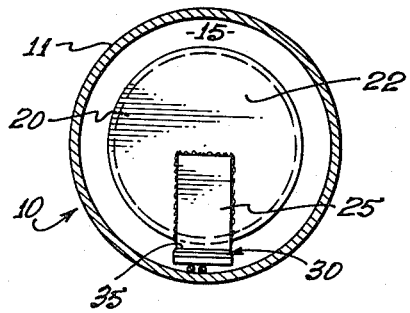
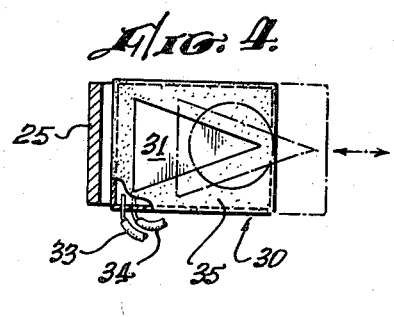
EUGENE I. KAZAN,
INVENTOR.
BY HIS ATTORNEYS
Spensley & Horn.

United States Patent Office 3,159,750
Patented Dec. 1, 1964

3,159,750
PHOTOELECTRIC PRESSURE TRANSDUCER
Eugene I. Kazan, 7718 Alcove Ave.,
North Hollywood, Calif.
Filed Oct. 1, 1962, Ser. No. 227,378
3 Claims. (Cl. 250—231)

This invention relates to force responsive devices and more particularly to pressure transducers utilizing a photoelectric sensor.

Transducers in which a force-summing means varies the amount of light impinging upon a photoelectric sensor are well known in the art. In these transducers, a variation in the amount of light radiation impinging upon the photoelectric sensor causes a variation in the electrical characteristics of the sensor which is thus a measure of the force imposed. The force-summing means may be a rod, diaphragm, weight, or any other member subject to motion in space as a result of forces imposed thereon. The force-summing means is the medium for summing of applied forces and transmitting the summed forces to the photoelectric sensor. Through the use of an appropriate force-summing means, the transducer may be utilized to measure such phenomena as displacement, pressure, velocity and acceleration. Hence, this invention further relates to and may be employed in the aforementioned various types of transducers.

Photoelectric transducers offer certain practical advantages over the various other types of transducers in current use, such as the variable reluctance and strain gauge types. The variable reluctance type of sensor requires electronic circuitry, namely an oscillator and its associated power supply. The power supply should have fairly good regulation and the variable reluctance sensor must be properly balanced. The variable reluctance type of transducer is characterized by relatively low output, an output of one or two millivolts for a ten-volt input being typical. The strain gauge type of transducer, the sensor of which may use resistance wire or semiconductor material, commonly requires temperature compensation as well as balancing of the usual bridge circuitry. Furthermore, the input voltage must be maintained relatively constant, and the wire type of strain gauge element suffers from the additional disadvantage of relatively low sensitivity. The use of a photoelectric sensor in transducer applications provides the desired high sensitivity and obviates the necessity of balancing the sensor and providing temperature compensation. However, at the present state of the art, photoelectric transducers are not without their attendant disadvantages. Typical photoelectric transducer structures in current use utilize movable mirrors or variable apertures to vary the amount of light impinging upon the photoelectric sensor in accordance with changes in applied forces, thereby resulting in a relatively complex structure which is quite sensitive to mechanical shock and requires frequent mechanical adjustment and realignment. Some present art photoelectric transducer structures utilize electronic circuitry in conjunction with optical lenses, thereby resulting in a relatively expensive and bulky transducer. The present invention is directed toward obviating the disadvantages of current art photoelectric transducer structures.

Accordingly, it is an object of the present invention to provide improved transducer structures utilizing photoelectric sensors.

It is also an object of the present invention to provide compact and rugged photoelectric transducer structures.

It is a further object of the present invention to provide relatively inexpensive and simple photoelectric transducers.

It is yet another object of the present invention to provide photoelectric transducer structures which are self-contained and requires no additional source of power.

It is a yet further object of the present invention to provide sensitive photoelectric transducers which provide a fairly linear output.

The objects of the present invention are accomplished by a novel transducer structure in which the photoelectric sensor is mounted to the movable element of a force-summing means within a light-tight chamber. Also mounted within the chamber is a light source for emission of a collimated light beam, movement of the force-summing means in response to applied forces causing the photoelectric sensor mounted thereon to move across the light beam. A light-imprevious mask is mounted to the light-sensitive surface of the photo-electric device, the mask having an opening of predetremined configuration so that a different amount of light from the collimated light beam impinges on the light-sensitive surface at each position of the photoelectric device. Hence, upon movement of the photoelectric device along a predetermined path in response to forces applied to the force-summing means the amount of light from the light beam impinging on the light-sensitive surface will vary to thereby cause a predetermined variation in the electrical characteristics of the photoelectric device. The photoelectric device is provided with electrical contacts which are placed in communication with the exterior of the transducer housing. Thus, unlike the more common prior art photoelectric transducers, in the present invention photoelectric transducer structure the photoelectric sensor moves with respect to a constant collimated light beam, the amount of light impinging upon the photoelectric sensor being controlled by a light-impervious mask fixedly secured to the light-sensitive surface of the photoelectric device. In the presently preferred embodiment, the light-impervious mask has an opening of substantially triangular shape so that movement of the photoelectric device in response to applied forces results in substantially linear changes in the electrical characteristics of the photoelectric device.

The novel features which are believed to be characteristic of the invention, both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a perspective view of a pressure transducer in accordance with the present invention concept;

FIGURE 2 is an elevation view, partly in section, of the pressure transducer of FIGURE 1;

FIGURE 3 is a view taken along the lines 3—3 of FIGURE 2; and

FIGURE 4 is a plan view of a photocell used in the transducer of FIGURE 1, the view showing the details of the light-impervous mask.

Turning now to the drawings, there is shown in the figures various views of a pressure transducer structure utilizing the present invention concepts. FIGURE 1 of the drawing shows a perspective view of the transducer housing, generally indicated by the reference numeral 10. The transducer housing consists of a cylindrical tubular casing 11, sealed at its ends by end plates 12 and 13. The end plates 12 and 13 are provided with reduced diameter projecting portions 12a and 13a, respectively, to fit tightly within the casing to seal the casing and define a light-tight chamber 15 therein. Mounted to the end plate 12 is a pressure fitting 16, the pressure fitting extending through the end plate and into the chamber 15 to provide a pressure inlet therefor. Mounted to the reduced diameter portion 12a of the end plate 12, within the chamber 15, is an elongate bellows 20, the mouth 21 of the bellows being peripherally sealed to an inwardly directed shoulder portion of the end plate and encircling the pressure inlet provided by the pressure fitting 16. Thus, the pressure fitting 16 communicates directly with the interior of the bellows 20. Thus, the bellows 20 provides the force-summing means for the illustrated transducer embodiment, the sealed end 22 of the bellows moving longitudinally of the casing 11 in response to variations in pressure applied at the pressure fitting 16. Use of a bellows as the force-summing means of the pressure transducer provides greater pressure responsive movements than a diaphragm or other common pressure responsive elements, and hence is presently preferred.

Mounted to the sealed end 22 of the bellows 20, by means of L-shaped bracket 25, is a photoelectric device in the form of a solar cell 30. Although a solar cell is utilized as the photoelectric device in the illustrated embodiment, any well-known type of photocell can be used, such as a photoconductive detector, a phototube, a photovoltaic cell, or a phototransistor, for example. The upper, light-sensitive surface 31 of the solar cell has fixedly secured thereto a light-impervious mask 35. The mask 35 defines a triangular opening, as can best be seen in FIGURE 4, to expose a triangular portion of the underlying light-sensitive surface of the solar cell. Electrical contact to the solar cell 30 is provided by means of lead wires 33 and 34, the free ends of the lead wires being soldered to the terminals of an electrical connector 40 mounted to the end plate 13. Thus, upon application of pressure to the pressure fitting 16 and resulting longitudinal movement of the bellows 20, the solar cell 30 will be caused to move longitudinally within the casing 11 in accordance with movement of the sealed end 22 of the bellows.

Extending radially into the casing 11, between the sealed end of the bellows 20 and the end plate 13, is a cylindrical mounting tube 42 of light-impervious material. The tube 42 is peripherally sealed around an opening in the peripheral surface of the casing 11, the interior portion of the tube 42 adjacent the casing 11 being threaded for reception of a sealing plug 43. With the sealing plug 43 in position, the light-tight integrity of the chamber 15 is maintained. Mounted at the other end of the tube 42 is a closure plate 44 of an electrical insulating material, the plate 44 having a circular central aperture therein. A pair of electrical terminals 46 and 47 are mounted to the plate 44, the electrical terminals being generally C-shaped and held by clamping action to the plate 44 at diametrically opposite points of the central aperture as shown. The electrical terminals 46 and 47 are connected by electrical leads 48 and 49 to terminals of the electrical connector 40.

A light source, generally indicated by the reference numeral 50, comprises a light bulb 51 sealed within a tubular plastic container 52, electrical terminals 53 and 54 providing electrical contact surfaces 56 and 57 projecting from the end of the plastic container adjacent the tip of the light bulb 51. The outer diameter of the plastic container 52 is only slightly less than the inner diameter of the tube 42 and the contact surfaces 56 and 57 are positioned in diametrically opposite alignment and spaced apart by a distance equal to the spacing of the electrical terminals 46 and 47.

The light source is mounted by insertion of the plastic container 52 into the tube 42, with the contact surfaces 56 and 57 innermost to contact the terminals 46 and 47. The plug 43 is then screwed into place until it bears against the end of the container 52 and so urges it into the tube 42 and maintains the contact surfaces 56 and 57 in physical contact with the terminals 46 and 47. The light source may be prevented from rotating within the tube 42 by means such as a well-known keying arrangement, not shown. The plastic container 52 is fabricated of a light-absorbent material so that the only light emitted from the light source 50 emanates from the tip light bulb 51 projecting from the plastic container 52. The closure plate 44 is constructed of a light-impervious material so that it, in conjunction with the plastic container 52, functions to collimate the light emitted by the light bulb 51 into a beam downwardly directed as indicated by the arrow 60 in FIGURE 2, the light beam being of substantially circular cross section.

In operation, a source of D.C. illuminating voltage is connected to the proper terminals of the connector 40 to energize the light bulb 51 through the electrical leads 48 and 49. A suitable electrical indicating device is connected to the proper terminals of the connector 40 and coupled to the solar cell 30 through the electrical leads 33 and 34 to measure changes in the electrical characteristics of the solar cell upon variation in the amount of light impinging upon its light-sensitive surface. For example, when the photo-sensitive device is a solar cell, the electrical measuring means can be a galvanometer. When the photoelectric device is a photo-conductive detector, then the electrical measuring means may be an ohmmeter.

In operation, the pressure to be measured is applied through a suitable conduit to the pressure fitting 16 to cause movement of the bellows 20 in accordance with changes in applied pressure. FIGURE 2 of the drawing shows the relative positions of the solar cell 30 and the light bulb when the interior of the bellows 20 is maintained at atmospheric pressure. Under such conditions, the collimated light beam from the light bulb 51 will strike the solar cell 30 in the circular pattern indicated by the dotted line in FIGURE 4 due to the presence of the mask on the upper light-sensitive surface of the solar cell, only a generally triangular portion of the light-sensitive surface will be exposed to the light radiation. However, upon application of pressure to the pressure fitting 16 and the resulting expansion of the bellows 20 and movement of the solar cell toward the light beam, it is seen that a greater triangular portion of the light-sensitive surface of the solar cell will become irradiated. By utilizing a substantially triangular mask opening, the change in electrical characteristics of the photocell are substantially linear with changes in applied pressure.

The casing 11 and the end plates 12 and 13, together with the tube 42 are preferably fabricated from metal, thereby resulting in a rugged transducer housing. The light bulb assembly comprising the light source can be easily changed merely by unscrewing the plug 43 and inserting a new light source. By mounting of the solar cell 30 directly to the movable end of the bellows, in conjunction with the triangular mask fixedly secured to the light-sensitive surface of the solar cell, an extremely rugged and simple system results, without the use of any mechanical coupling or linkages and their attendant adjustment problems. Thus, there has been described a pressure transducer utilizing a photoelectric transducer in accordance with the present invention concepts. It is readily apparent that the illustrated structural features are equally applicable in the fabrication of a differential pressure transducer. To provide a differential pressure transducer, the force-summing means would be in the form of two axially aligned bellows, one of the bellows being mounted to each end of the casing and with their free ends interconnected. The photoelectric device is then mounted to the interconnected bellows ends for movement therewith in response to changes in the differential pressure between the interiors of the two bellows. Hence, although the invention has been described with a certain degree of particularity, it is understood that the present disclosure has been made only by way of example and that numerous changes in the details of construction and the combination and arrangement of parts may be resorted to without departing from the spirit and the scope of the invention as hereinafter claimed. For example, although the illustrated embodiment is directed to a pressure transducer, it will be readily apparent to those skilled in the art that the present invention concepts are equally applicable for use with force-summing means of different types and construction from the illustrated bellows arrangement. For example, a spring-loaded mass could be used as the force-summing means in an accelerometer embodiment, the photoelectric device being mounted to the mass.

Furthermore, although in the illustrated embodiment the source of illuminating voltage for the light bulb is located without the transducer housing, it is apparent that a mercury battery or other suitable voltage source could be contained within the housing.

What is claimed is:

1. A pressure transducer comprising, in combination:
   (a) a cylindrical tubular casing sealing at one of its ends by a first end plate and at the other of its ends by a second end plate to thereby define a light-tight chamber therein;
   (b) elongate bellows means mounted at one of its ends to said first end plate and extending into said chamber, said bellows means including a pressure inlet extending through said first end plate for the application of pressure to the interior of said bellows to cause substantially linear movement of the other end of said bellows in response to changes in applied pressure;
   (c) a light bulb mounted within said chamber, said light bulb being encased within a light-tight housing having an opening therein for collimating light radiated by said bulb into a beam which travels along a predetermined direction;
   (d) a photocell mounted to said other end of said bellows within said chamber, the light-sensitive surface of said photocell being aligned substantially normal to said predetermined direction and being disposed at least partially within the path of said collimated beam of light;
   (e) a light-impervious mask fixedly secured to the light-sensitive surface of said photocell, said mask defining a predetermined opening therethrough to expose a substantially triangular portion of said light-sensitive surface whereby upon movement of said bellows means and said photocell in response to pressure applied to said inlet the amount of light from said light beam impinging upon said light-sensitive surface will vary to thereby cause a predetermined variation in the electrical characteristics of said photocell; and,
   (f) an electrical plug connector mounted to said second end plate and including a plurality of electrical terminals extending into said chamber, some of said electrical terminals being electrically connected to said light bulb for the application of an illuminating voltage thereto, others of said electrical terminals being connected to said photocell for measuring changes in electrical characteristics thereof.

2. A pressure transducer comprising, in combination:
   (a) a housing defining a light-tight chamber therein;
   (b) pressure-responsive means mounted within said chamber and including a pressure inlet communicating with the exterior of said housing, said pressure-responsive means including an element movable in response to differences in pressure applied to said inlet;
   (c) a selectively actuable light source mounted within said chamber for radiating a constant collimated beam of light in a predetermined direction;
   (d) a photoelectric device mounted to the movable element of said pressure-responsive means within said chamber and having a light-sensitive surface aligned substantially normal to said predetermined direction, said photoelectric device being disposed for movement of said light-sensitive surface along a predetermined path at least partially across said light beam upon movement of said movable element in response to changes in pressure applied to said inlet;
   (e) a light-impervious mask fixedly secured to said light-sensitive surface, said mask defining a substantially triangular opening therethrough to expose a portion of said light-sensitive surface with an apex of the triangle disposed on said predetermined path whereby upon movement of said photoelectric device along said predetermined path in response to changes in pressure applied to said inlet the amount of light from said light beam impinging upon said light-sensitive surface will vary to thereby cause a predetermined variation in the electrical characteristic of said photoelectric device; and,
   (f) means for measuring changes in the electrical characteristics of said photoelectric device, said measuring means comprising electrical contacts mounted to said photoelectric device and communicating with the exterior of said housing.

3. A transducer comprising, in combination:
   (a) a housing defining a light-tight chamber therein;
   (b) force-summing means mounted within said chamber and in communication with the exterior of said housing for the application thereto of forces to be measured, said force-summing means including an element movable in response to applied forces;
   (c) a selectively actuable light source mounted within said chamber for radiating a constant collimated beam of light in a predetermined direction;
   (d) a photoelectric device mounted to the movable element of said force-summing means within said chamber and having a light-sensitive surface aligned substantially normal to said predetermined direction, said photoelectric device being disposed for movement of said light-sensitive surface along a predetermined path at least partially across said light beam upon movement of said movable element in response to applied forces;
   (e) a light-impervious mask fixedly secured to said light-sensitive surface, said mask defining a substantially triangular opening therethrough to expose a portion of said light-sensitive surface with an apex of the triangle positioned on said predetermined path whereby upon movement of said photoelectric device along said predetermined path in response to forces applied to said force-summing means the amount of light from said light beam impinging upon said light-sensitive surface will vary to thereby cause a predetermined variation in the electrical characteristics of said photoelectric device; and,
   (f) means for measuring changes in the electrical characteristics of said photoelectric device, said measuring means comprising electrical contacts mounted to said photoelectric device and communicating with the exterior of said housing.

References Cited by the Examiner

UNITED STATES PATENTS

| | | | |
|---|---|---|---|
| 2,137,024 | 11/38 | Moore et al. | 250—215 |
| 2,442,145 | 5/48 | Ray | 250—215 X |
| 2,648,801 | 8/53 | Hall | 200—83.3 X |
| 2,896,086 | 6/59 | Wunderman | 250—211.2 |

RALPH G. NILSON, *Primary Examiner.*

WALTER STOLWEIN, *Examiner.*